(12) United States Patent
Abdelmalek et al.

(10) Patent No.: US 9,579,551 B2
(45) Date of Patent: Feb. 28, 2017

(54) SHAFT LOCK FOR INTERCONNECTION BETWEEN LACROSSE STICK HANDLE AND HEAD

(71) Applicants: Anthony Abdelmalek, Baltimore, MD (US); Michael Schmittdiel, Baltimore, MD (US); John Vajda, Stewartstown, PA (US)

(72) Inventors: Anthony Abdelmalek, Baltimore, MD (US); Michael Schmittdiel, Baltimore, MD (US); John Vajda, Stewartstown, PA (US)

(*) Notice: Subject to any disclaimer, the term of this patent is extended or adjusted under 35 U.S.C. 154(b) by 0 days.

(21) Appl. No.: 14/270,790

(22) Filed: May 6, 2014

(65) Prior Publication Data

US 2014/0235377 A1    Aug. 21, 2014

Related U.S. Application Data

(63) Continuation-in-part of application No. 13/561,640, filed on Jul. 30, 2012, now abandoned.

(51) Int. Cl.
*A63B 59/02* (2006.01)
*A63B 65/12* (2006.01)
*F16B 7/18* (2006.01)

(52) U.S. Cl.
CPC .............. *A63B 59/02* (2013.01); *A63B 59/20* (2015.10); *A63B 60/50* (2015.10); *A63B 49/032* (2015.10);
(Continued)

(58) Field of Classification Search
CPC ...................................................... A63B 59/02
(Continued)

(56) References Cited

U.S. PATENT DOCUMENTS 2,606,050 A * 8/1952 Morris ..................... A01B 1/00
                                                      172/371
2,697,642 A * 12/1954 Rudy ....................... B25G 3/00
                                                      15/105
(Continued)

OTHER PUBLICATIONS

Web page download, Brassnutsinserts2011, 2011, //brass-roto-rotational-moulding-inserts.brass-nuts-inserts.com/, 1 page.*
(Continued)

*Primary Examiner* — Gene Kim
*Assistant Examiner* — M Chambers
(74) *Attorney, Agent, or Firm* — Baker, Donelson, Bearman, Caldwell & Berkowitz, PC; Royal W. Craig

(57) ABSTRACT

A shaft lock for interconnection of an elongate tubular lacrosse handle and a plastic lacrosse head. The shaft lock comprises an elastomeric insert compression-fitted inside the handle. The insert has a compressible body portion which, in an uncompressed form generally conforms to the interior walls of the handle and is defined by a plurality of co-planar ribs that span the interior walls of the handle. A hard screw-anchor is embedded within the elastomer insert, and the insert is anchored inside the handle by at least one screw threaded through the handle into the screw-anchor from top-to-bottom, the screw(s) engaging the screw anchor and compressing it against the elastomeric insert. The threaded engagement of the screw(s) through the wall of the handle and into the screw-anchor compresses the elastomeric insert, maintaining a constant tension against the screw(s) and against the interior walls of the handle. This avoids loosening and/or dislodgement as a result of impact or vibration, and resists the threads of the screw from stripping either the handle wall(s) or the insert as a result of torque or other stress.

6 Claims, 4 Drawing Sheets

(52) U.S. Cl.
CPC ............... *A63B 60/06* (2015.10); *A63B 60/08* (2015.10); *A63B 60/10* (2015.10); *A63B 2102/14* (2015.10); *F16B 7/182* (2013.01); *Y10T 403/54* (2015.01)

(58) Field of Classification Search
USPC ................ 473/505, 510, 512, 513; D21/724; 16/417, 42 R, 43, 45; 285/382; 403/225, 403/227, 137, 379.6, 409, 410, 411
See application file for complete search history.

(56) References Cited

U.S. PATENT DOCUMENTS

| | | | | |
|---|---|---|---|---|
| 5,865,694 | A * | 2/1999 | Duong-Van ........ | A63B 59/0092 473/520 |
| 6,595,713 | B1 * | 7/2003 | Wilson ................... | B63H 16/04 16/405 |
| 2004/0058758 | A1 * | 3/2004 | Kohler ................... | A63B 59/02 473/513 |
| 2004/0072638 | A1 * | 4/2004 | Enos ....................... | A63B 59/02 473/513 |
| 2005/0075200 | A1 * | 4/2005 | Brine, III ............... | A63B 59/02 473/513 |
| 2007/0004541 | A1 * | 1/2007 | Price ...................... | A63B 59/02 473/513 |
| 2007/0049431 | A1 * | 3/2007 | Meyer ................ | A63B 59/0014 473/513 |
| 2007/0117661 | A1 * | 5/2007 | Lucas .................... | A63B 59/02 473/505 |
| 2011/0092322 | A1 * | 4/2011 | Sykora ................... | A63B 59/02 473/513 |
| 2013/0244816 | A1 * | 9/2013 | Lignelli ............. | A63B 59/0092 473/513 |
| 2014/0235377 | A1 * | 8/2014 | Abdelmalek ...... | A63B 59/0088 473/513 |

OTHER PUBLICATIONS

Web page download, Kayguay2010, 2010, web.archive.org/web/20100527162008/http://www.kayguay.com.tw/products/plastic/P/tubeinsert.html, 3 pages.*

Web page download, thingiverse2012, 2012, http://www.thingiverse.com/thing:30576, 3 pages.*

* cited by examiner

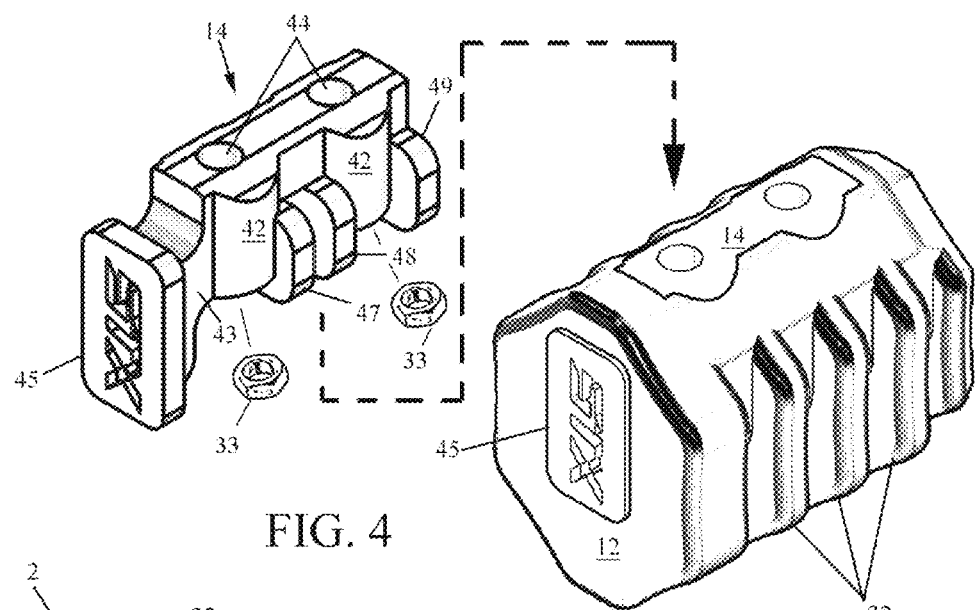
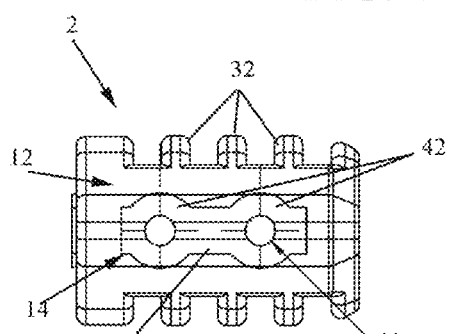
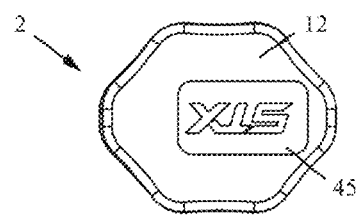
FIG. 4
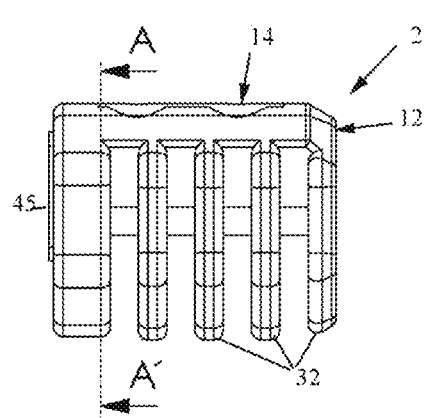
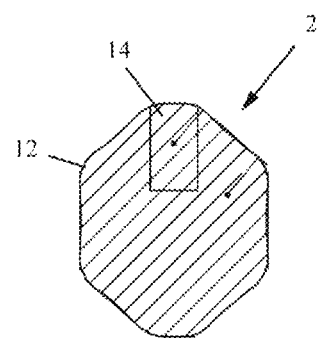
FIG. 5     FIG. 6
FIG. 7     SECTION A-A
                      FIG. 8

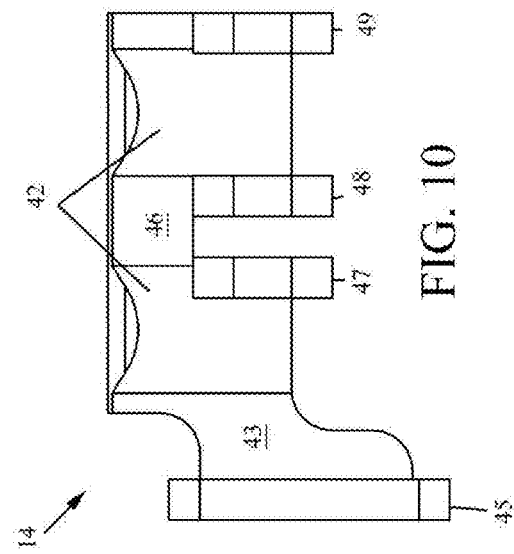
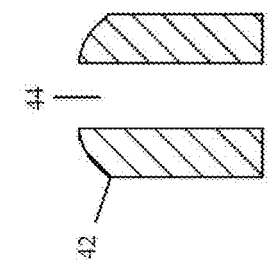
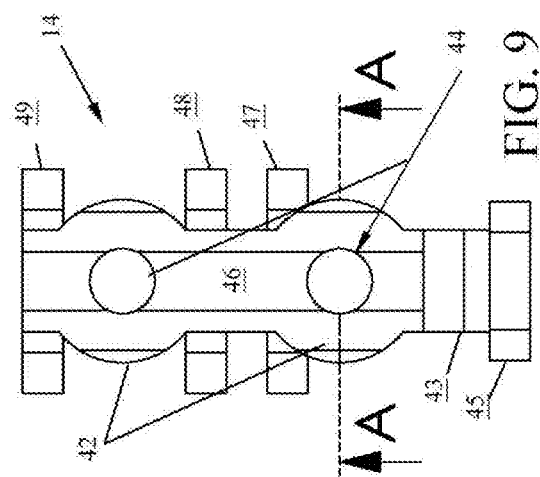
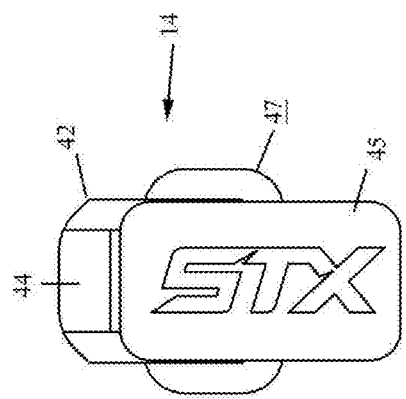
FIG. 10
SECTION A-A
FIG. 12
FIG. 9
FIG. 11

SHAFT LOCK FOR INTERCONNECTION BETWEEN LACROSSE STICK HANDLE AND HEAD

CROSS-REFERENCE TO RELATED APPLICATION(S)

The present application is a continuation-in-part of patent application Ser. No. 13/561,640 filed 30 Jul. 2012.

BACKGROUND OF THE INVENTION

1. Field of the Invention

The present invention relates generally to sports equipment and, more particularly, to an improved shaft lock for interconnection between the handle and head of a lacrosse stick.

2. Description of the Background

In 1970, the introduction of double-wall, synthetic lacrosse heads revolutionized the game of lacrosse. In comparison to the traditional wooden single-wall heads, the synthetic heads imparted a lightness, maneuverability, and flexibility never-before experienced by lacrosse players. These performance advantages greatly enhanced players' skills such as throwing, catching, cradling, and scooping, and brought the sport of lacrosse to new levels of speed and excitement.

FIG. 1 illustrates a conventional molded-head lacrosse stick. As shown, a typical lacrosse stick includes a handle or shaft 20 (dashed lines) and a double-wall synthetic head 10. Head 10 includes a generally V-shaped frame having two sidewalls 14A, 14B joined by a socket 11 at the end narrow end of the "V" for receiving and seating the shaft 20. A transverse wall (or "scoop") 16 joins the sidewalk 14A, 14B at the open end of the "V." Webbing is woven between the sidewails 14A, 14B, scoop 16 and stop member 18 to form a pocket. The "double-wall" descriptor applied to the head 10 refers to the act that it has two sidewalls as opposed to the single sidewall found in traditional wooden lacrosse sticks in which the pocket is completed by a woven gut wall in place of a second, wooden sidewall. The shaft 20 joins the narrow end of the head 10 and is received in socket 11, which includes a stop member 18 defined by a closed-ended socket, and an outer throat 12 supported by extensions of the sidewalls. The throat 12 and stop member 18 are integrally joined to form one unitary socket 11. Typically, a screw or other fastener 22 placed through stop member 18 secures the shaft 20 to head 10. The traditional double-wall head 10 is a monolithic structure that is injection-molded from synthetic materials such as nylon, urethane and polycarbonate as known in the art.

FIG. 2 illustrates a conventional injection molded goalie head comprising the same components as a field player's lacrosse stick illustrated in FIG. 1 but having a different overall shape due to its generally larger dimensions.

The typical features of a lacrosse stick are shown generally in Tucker et al., U.S. Pat. No. 3,507,495, Crawford et al., U.S. Pat. No. 4,034,984, and Tucker et al., U.S. Pat. No. 5,566,947, which are all incorporated by reference herein.

The traditional double-wall synthetic head is an injection-molded, monolithic structure. Examples of suitable synthetic materials well known in the art include nylon, polypropylene (PP), polyethylene (PE), amorphous polar plastics (e.g., polycarbonate (PC)), polymethylmethacrylate (PMMA), polystyrene (PS), high impact polystyrene (HIPS), polyphenylene oxide (PPO), modified polyethylene terphthalate (PETG), acrylonitrile butadiene styrene (ABS), semicrystalline polar plastics (e.g., polyester PET and PBT), polyamide Nylon 6 and Nylon 66), urethane, polyketone, polybutylene terephalate, acetals (e.g., Delrin™ by DuPont), acrylic, acrylic-styrene-acrylonitrite (ASA), metallocene ethylene-propylene-diene terpolymer (EPDM) (e.g., Nordel™ by DuPont), and composites. When first introduced, these materials were clearly superior to wood, offering players improved handling and durability. For example, a lacrosse head constructed of DuPont™ ZYTEL ST 801 nylon resin is able to withstand the bending and harsh impacts inherent to competition far better than a traditional wooden stick. As another example, a polycarbonate head, though having a flexibility similar to wood, is more structurally durable than wood and much lighter and, therefore, easier to maneuver when attached to a handle.

Ever since the plastic head was incorporated on competition lacrosse sticks in the 1970s the plastic head has been attached to the handle with a simple screw connection, e.g., a "self-tapping" screw through the plastic head and handle (self-tapping screws cut their own threads).

The durability of that connection has long been an issue for several reasons. Repeatedly removing and re-assembling the components will eventually strip the hole and prevent stable assembly. In addition, the stresses on competition lacrosse sticks during play weakens the conventional connection inevitably to the point where the head sometimes loosens or even dislodges from the handle during play. Loosening/dislodgement can occur as the screw unscrews as a result of vibration, or as a result of the threads of the screw stripping from torque or other stress when no other forces are brought to bear to prevent these occurrences. The problem has grown acute due to the increasing use of lighter and thinner-walled handles. The thread engagement is often limited to two or fewer threads, causing excessive stress and instability of the head/handle connection. Stripping and loosening of the head/handle connection results. Further, when the handle is impacted, as frequently occurs during competitive play, the walls can compress or expand and the screw threads can strip. To combat these issues, players often resort to taping over the head/handle connection, but tape adds weight and is only a temporary fix at best. Finally, like all athletes, lacrosse players are bigger and stronger than they have ever been, so pressures on the screw connection are increasing from the increased torque applied by stronger players.

Previous efforts to solve the head/handle connection problem have been ineffective. For example, U.S. Pat. No. 8,052,549 to Sykora discloses a non-resilient plug-like insert with a magnet for insertion into the handle. But the Sykora insert adds excessive weight and does not remain securely in position. Other advertised inserts devised for this same purpose have been of different constructions from the device disclosed by the Applicant and due to those constructions fail to satisfy the need for a more robust interconnection for the handle and head of a lacrosse stick to avoid loosening and head rattle.

References in this application to "competitive play", "competitive sticks" and the like refer to lacrosse games and sticks that are subject to a governing body set of rules and regulations, such as the NCAA for men's lacrosse, US Lacrosse for women's lacrosse, the National Federation of State High School Association for much of high school lacrosse and variations adopted by individual private school and recreational leagues. Such terms do not refer to articles that have some or all of the basic components of lacrosse sticks (e.g. STX "Fiddle STX") but which due to their overall size, durability, etc. are not intended for use in competitive play.

SUMMARY OF THE INVENTION

It is, therefore, an object of the invention to provide a robust, dual-material connection mechanism for the handle and head of a lacrosse stick that employs a hard plastic (e.g., Nylon) screw-anchor embedded in an elastomeric body that fits snugly within various inner handle dimensions. Applicant's device and all other devices intended for the purpose of securing a lacrosse head/handle connection are hereinafter referred to as a "shaft lock."

In accordance with the foregoing object, the present invention is an improved shaft lock for interconnection of an elongate tubular lacrosse handle and a plastic head. In a preferred embodiment, the shaft lock comprises an elastomeric insert compression-fitted inside the handle. The insert has a compressible body portion which, in an uncompressed form generally conforms to the interior walls of the handle and is defined by a plurality of co-planar ribs that span the interior walls of the handle. A rigid screw-anchor is embedded within the elastomer insert, and the insert is anchored inside the handle by at least one screw threaded through the handle into the screw-anchor from top-to-bottom, the screw(s) engaging the screw anchor and compressing it against the elastomeric insert. The threaded engagement of the screw(s) through the wall of the handle and into the screw-anchor compresses the elastomeric insert, maintaining a constant tension against the screw(s) and against the interior walls of the handle. The screw-anchor optionally has a metal nut component to accommodate the screw(s). This interaction avoids loosening and/or dislodgement of the screws as a result of impact or vibration, and keeps the threads of the screw from stripping either the handle wall(s) or the insert as a result of torque or other stress.

Further, the forces brought to bear by the compression of the plastic head onto the handle during assembly contribute to a more secure engagement since the head is attached to the handle over the handle segment containing the above-described attachment mechanisms. The present invention is described in greater detail in the detailed description of the invention, and the appended drawings. Additional features and advantages of the invention will be set forth in the description that follows, will be apparent from the description, or may be learned by practicing the invention.

BRIEF DESCRIPTION OF THE DRAWINGS

Other objects, features, and advantages of the present invention will become more apparent from the following detailed description of the preferred embodiments and certain modifications thereof when taken together with the accompanying drawings in which:

FIG. 4 is a perspective assembly view of the shaft lock 2.
FIG. 5 is a top view of the shaft lock 2 of FIG. 4.
FIG. 6 is an end view of the shaft lock 2 of FIGS. 4-5.
FIG. 7 is a side view of the shaft lock 2 of FIGS. 4-6.
FIG. 8 is a cross-section taken along the lines A-A of FIG. 7.
FIG. 9 is a top view of the anchor block 14 of FIG. 4.
FIG. 10 is a side view of the anchor block 14 of FIG. 9.
FIG. 11 is an end view of the anchor block 14 of FIGS. 9-10.
FIG. 12 is a cross-section of anchor block 14 taken along the lines A-A of FIG. 9.

DETAILED DESCRIPTION OF THE PREFERRED EMBODIMENT

Reference will now be made in detail to preferred embodiments of the present invention, examples of which are illustrated in the accompanying drawings. Wherever possible, the same reference numbers will be used throughout the drawings to refer to the same or like parts.

The present invention is a shaft lock for interconnection between an elongate tubular lacrosse handle and a plastic head having a socket for insertion of the handle.

Figure 3:
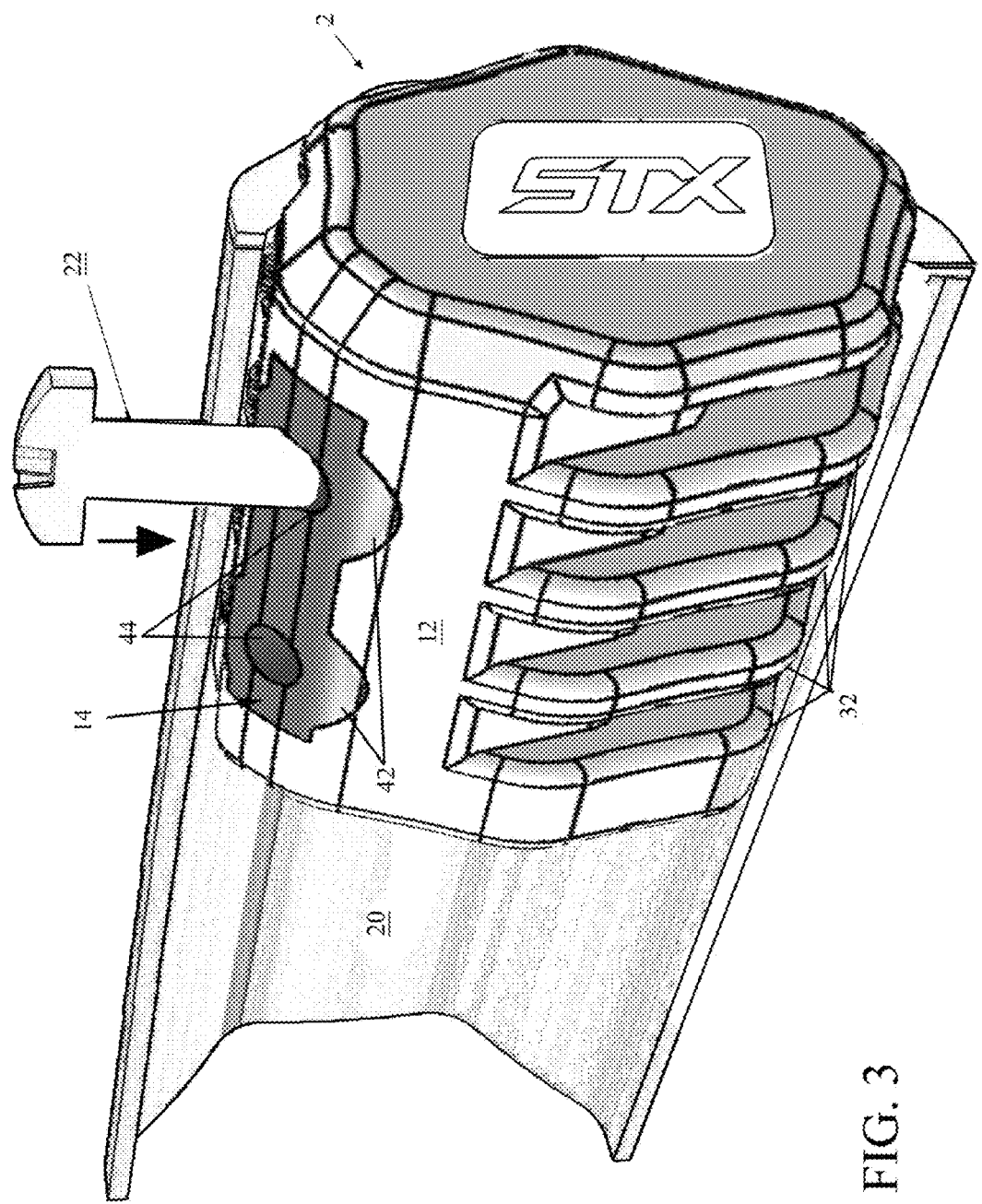
FIG. 3 is a perspective view of an exemplary embodiment of the shaft lock 2 of the present invention inserted inside handle 20.

FIG. 3 is a perspective view of an exemplary embodiment of the shaft lock 2 generally comprising an over-molded dual-durometer insert compression-fitted inside the handle 20.

Figures 1, 2:
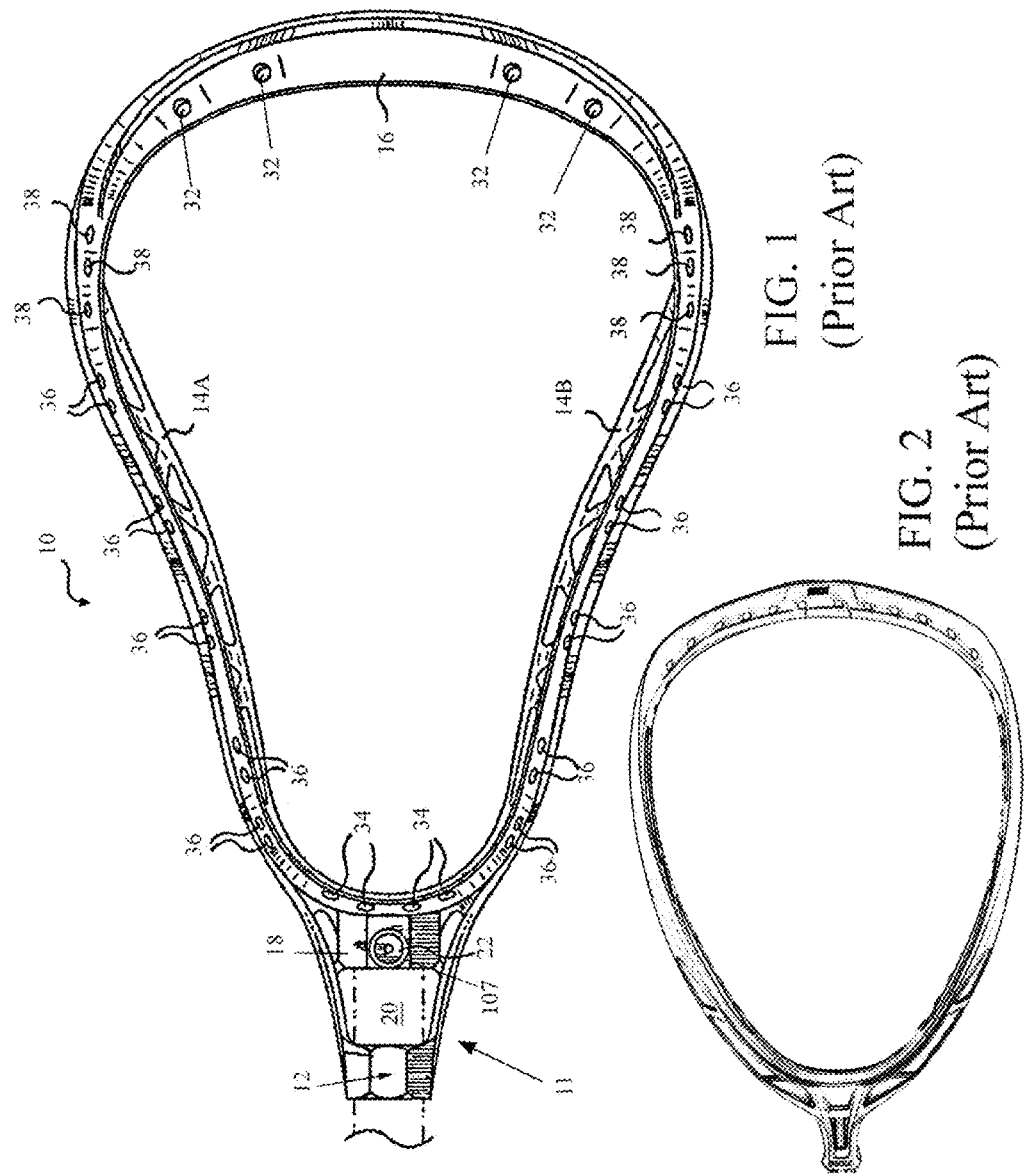
FIG. 1 is a front view of a conventional lacrosse stick with handle 20 inserted in molded plastic head 10, and conventional (prior art) screw fastener 22 placed through opening 107 securing handle 20 to head 10.
FIG. 2 illustrates a conventional injection molded goalie head incorporating the same prior art components as the field player's lacrosse stick illustrated in FIG. 1, albeit with a different overall shape due to its generally larger dimensions.

The elongate tubular lacrosse handle 20 may be any conventional tubular lacrosse handle such as a traditional octagonal cross-section formed of aluminum or composite materials. The plastic head 10 (see FIGS. 1-2) likewise has a traditional basket-frame with a socket at one end for insertion of the handle 20. The lacrosse handle 20 is fixedly attached inside the socket of the head using the shaft lock 2 of the present invention.

The shaft lock 2 has an elastomeric compressible body portion 12 which, in an uncompressed form generally conforms to the interior walls of the handle 20 and is sized for a close compression fit. A screw-anchor block 14 is embedded within the elastomeric body portion 12, and the shaft lock 2 anchors the handle 20 inside the socket by at least one and preferably two screws 22 threaded through the socket and handle 20 and into the anchor block 14 from top-to-bottom. The screw(s) 22 engage the anchor block 14 and compress it and the elastomeric body portion 12. The threaded engagement of the screw(s) 22 into the screw-anchor block 14 in combination with the resiliency of the elastomeric body portion 12 maintains a constant tension against the screw(s) 22. This avoids loosening and/or dislodgement of the screws 22 as a result of impact or vibration, and keeps the threads of the screw(s) 22 from stripping either the handle wall(s) or the insert as a result of torque or other stress. FIGS. 4-8 are side perspective, top, end and side views, respectively, of the shaft lock 2. With collective reference to FIGS. 4-7 the shaft lock 2 generally comprises a unitary overmolded dual-durometer shaft insert having a relatively softer elastomeric body portion 12 and a harder anchor block 14 embedded inside the body portion 12. The shaft lock 2 is sized for a close compression fit into an end of the handle, prior to that end of handle 20 being inserted into the socket (as will be described). Body portion 12 is deformable, and in its normal form takes a shape generally conforming to a segment of the interior volume of handle 20. In a preferred embodiment of shaft lock 2 one end is slightly smaller than the other to ease insertion into the handle 20. This may be accomplished in a variety of ways, including with a slight, gradual inward taper of body portion 12 toward the smaller end or, alternatively, by rounding the edges of body portion 12.

As seen in FIGS. 5-6 the shaft lock 2 is defined by top (FIG. 5), opposing ends (one shown in FIG. 6), and mirror-image sides (FIG. 7). FIG. 8 is a cross-section taken along the lines A-A of FIG. 7. Preferably, the sides are formed with a plurality of equally-spaced grooves that define a series of laterally-and-downwardly protruding ribs 32. Ribs 32 are entirely formed in the elastomeric body portion 12 and serve two purposes: 1) ribs 32 have increased resiliency and a degree of lateral freedom, which increases both their shock-absorbing capability as well as their ability to conform to handles 10 of various sizes; and 2) ribs 32 provide increased lateral friction against the interior walls of handle 20 and resist slipping and dislodgment. Body portion 12 may be molded from any suitable elastomeric material as a matter of design choice preferably having a Young's Modulus within a range of from 10-100 MPa or 1,450-14,503 lbf/in$^2$ (psi). Body portion 12 is preferably over-molded onto the skeletal anchor block 14, which itself is formed of a material of higher durometer than body portion 12. In the presently-preferred embodiment anchor block 14 is formed of hard plastic, such as Nylon, having a Young's Modulus within a range of from 2000-4000 MPa or 290,000-580,000 lbf/in$^2$ (psi).

FIGS. 9-12 are a top view, side view, end view, and cross-section, respectively, of the anchor block 14. Anchor block 14 is formed as a unitary molded component having at least one and preferably two (as shown) screw receptacles 42. Screw receptacles 42 are parallel semi-cylindrical members joined by a lateral crosspiece 46, and both screw receptacles 42 are defined by a preformed central through-hole 44 as shown. Anchor block 14 is flanked by four laterally-protruding flanges 45, 47, 48 and 49 which extend outward past receptacles 42 on opposing sides at spaced intervals along the anchor block 14. A distal endwise flange 45 is extended and submerged slightly at the end of a leg 43, flange 45 presenting itself flat and substantially centered at an axis of the handle 20. The distal endwise flange 45 remains exposed from body portion 12 and bears a visible advertising indicia. When the shaft lock 2 is inserted in the handle 20 and the handle inserted into the socket, the distal flange 45 abuts the closed end of the socket, aligns the screw-holes, and serves as a foot to leg 43 to reinforce the position of the shaft lock 2. The collective flanges 45, 47, 48 and 49 serve two purposes, one being to anchor and position the anchor block 14 along its length inside the body portion 12, and the other being to serve as a reinforcing skeleton within the resilient body portion to thereby limit its resiliency and prevent tearing. Anchor block 14 may be molded separately and embedded within body portion 12 by a conventional over-molding process, or alternatively, by in-molding/co-molding or any other means known in the art suitable for embedding one object in another.

Referring back to FIG. 3, the two molded sleeves 42 and through-bores 44 passing through the anchor body 14 from top to bottom serve as screw-anchors. Both molded sleeves 42 may optionally include metal nuts 33 seated or embedded therein to receive the screws. Thus, the shaft lock 2 is first inserted endwise into the handle 20 until the distal endwise flange 45 is flush with the handle 10 orifice and the advertising indicia exposed from body portion 12 as shown. Two screws 22 are threaded through pre-drilled holes in the walls of the socket/handle 20 combination and into the through-bores 44. As the screw(s) 22 are tightened, with or without underlying nut(s), the shaft lock 2 is drawn against the handle 20 wall, thereby sandwiching and compressing the resilient body portion 12 but expanding is laterally. The distorted body portion 12 inside handle 20 locks the shaft lock 2 in place, reinforces the junction, and securely fixes the head on the handle 20.

If desired, the screw(s) 22 may be extended to engage nuts 33 at the bottom of anchor block 14. The combination of a threaded engagement of the screws 22 through handle walls 10 and through shaft lock 2, plus the compressive force of the screws 22 biasing the shaft lock 2 against the handle 20, effectively provides amore stable reinforcing collar inside the handle 20 along the distal tip that is inserted into the head. This helps to avoid loosening and/or dislodgement as a result of impact or vibration, and resists the threads of the screw stripping either the handle walls or the insert as a result of torque or other stress. Moreover, the receptacles 42 of the Nylon anchor body 14 have a high coefficient of friction and prevent counter-rotation and loosening of the screws 22.

The machine screw(s) 22 can be conventional self-tapping screw(s) of a length calculated to extend at least partially through a majority of the anchor body 14 from top-to-bottom.

To assemble, the shaft lock 2 is placed inside the handle 20 with its through-bores 44 in axial alignment with both mounting holes in the handle 20 (as conventionally provided on commercial lacrosse stick handles). The lacrosse handle 20 is then inserted inside the socket of the head. The user inserts the screw(s) 22 through one wall of the socket of the head, and begins to thread it through the underlying wall of the handle 20 and into the shaft lock 2 using an appropriate implement such as a screw-driver or hex key. Tightening continues (optionally through the opposing wall of the handle 20), and through the other wall of the socket of the head 10, again optionally employing a nut beneath anchor block 14 as an anchor.

The foregoing securement of head to the handle 20 maintains a constant compressive force against the interior walls of the handle 20. This avoids loosening and/or dislodgement as a result of impact or vibration, and resists the threads of the screw stripping either the walls or the insert as a result of torque or other stress.

The foregoing disclosure of embodiments of the present invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims, and by their equivalents.

What is claimed is:

1. A lacrosse stick comprising:
   an elongate tubular handle;
   a head attached to said handle, said head having a frame with a socket for insertion of said handle; and
   a shaft lock for fixedly attaching said handle within the socket of said head, said shaft lock further comprising a resilient elastomeric body sized for insertion into a distal end of said tubular handle, and an anchor block embedded within said resilient body portion, said anchor block comprising at least one screw hole, a leg projecting endwise, and a plurality of transverse flanges projecting outward on opposing sides of said anchor block, one of said plurality of transverse flanges being distally attached at an end of said leg; and
   at least one screw threaded through a wall of said handle and into said anchor block.

2. The lacrosse stick according to claim 1, wherein said anchor block comprises two screw holes.

3. The lacrosse stick according to claim 1, wherein said anchor block comprises a metal nut seated in said anchor body for anchoring at least one screw.

4. The lacrosse stick according to claim 1, wherein said body portion comprises a plurality of ribs projecting outward on opposing sides of said body portion.

5. The lacrosse stick according to claim 1, wherein said body portion exposes a dorsal portion of said anchor block.

6. The lacrosse stick according to claim 1, wherein said body portion exposes said transverse flange distally attached to said leg.

* * * * *